(12) United States Patent
Leister et al.

(10) Patent No.: US 9,975,809 B2
(45) Date of Patent: May 22, 2018

(54) COATING SYSTEM BASED ON A COMBINATION OF MONOALUMINUM PHOSPHATE WITH MAGNESIUM OXIDE

(71) Applicant: Chemische Fabrik Budenheim KG, Budenheim (DE)

(72) Inventors: Michael Leister, Ingelheim (DE); Christian Graf, Mainz (DE); Kirstin Lippold, Nieder-Olm (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 220 days.

(21) Appl. No.: 14/772,585

(22) PCT Filed: Feb. 26, 2014

(86) PCT No.: PCT/EP2014/053679
§ 371 (c)(1),
(2) Date: Sep. 3, 2015

(87) PCT Pub. No.: WO2014/135407
PCT Pub. Date: Sep. 12, 2014

(65) Prior Publication Data
US 2016/0009600 A1    Jan. 14, 2016

(30) Foreign Application Priority Data
Mar. 8, 2013 (DE) .................. 10 2013 102 301

(51) Int. Cl.
| | |
|---|---|
| *C04B 28/34* | (2006.01) |
| *C04B 41/50* | (2006.01) |
| *C04B 41/85* | (2006.01) |
| *C04B 41/00* | (2006.01) |
| *C04B 111/00* | (2006.01) |

(52) U.S. Cl.
CPC ............ *C04B 28/34* (2013.01); *C04B 41/009* (2013.01); *C04B 41/5092* (2013.01); *C04B 41/85* (2013.01); *C04B 2111/00482* (2013.01)

(58) Field of Classification Search
CPC ... C04B 28/34; C04B 41/009; C04B 41/5092; C04B 41/85
See application file for complete search history.

(56) References Cited

U.S. PATENT DOCUMENTS

| | | | | | |
|---|---|---|---|---|---|
| 3,960,580 | A | * | 6/1976 | Stierli | C04B 28/30 106/690 |
| 2010/0237224 | A1 | * | 9/2010 | Laudenklos | B22C 3/00 249/115 |
| 2010/0304129 | A1 | | 12/2010 | Laudenklos | |

FOREIGN PATENT DOCUMENTS

| | | | |
|---|---|---|---|
| DE | 28 34 321 A1 | 2/1979 | |
| DE | 32 18 821 A1 | 11/1983 | |
| DE | 10 2005 042 474 A1 | 3/2007 | |
| DE | 10 2010 046 370 A1 | 3/2012 | |
| DE | 10 2011 005 813 A1 | 9/2012 | |
| EP | 0236617 * | 9/1986 | ............ C04B 12/02 |
| EP | 1 624 031 A2 | 2/2006 | |
| GB | 2 120 645 A | 12/1983 | |
| GB | 2 155 402 A | 9/1985 | |
| GB | 2 186 277 A | 8/1987 | |
| WO | WO-01/87798 A2 | 11/2001 | |
| WO | WO-2006/070021 A1 | 7/2006 | |

OTHER PUBLICATIONS

P. Donahue et al., "Durable phosphate-bonded natural fiber composite products", Construction and Building Materials, 2010, vol. 24, p. 215-p. 219.

* cited by examiner

*Primary Examiner* — John E Uselding

(74) *Attorney, Agent, or Firm* — Drinker Biddle & Reath LLP

(57) ABSTRACT

A coating system for coating inorganic substrates with a wide range of functional materials without having to use the usually necessary high temperatures includes an aqueous solution as component K1, which aqueous solution contains at least $Al(H_2PO_4)_3$ and $Al(NaHPO_4)_3$ in the following fractions on an oxide basis and in mass percent with respect to the total mass of the solution: $P_2O_5$=25.0 to 37.0, $Al_2O_3$=5.8 to 9.0, $Na_2O$=0.1 to 2.0, and $H_2O$=54.0 to 66.0, and which includes an additional component K2 having the constituents magnesium oxide, silicate, and borate, which are contained in K2 in the following fractions on an oxide basis and in mass percent with respect to the total mass of component K2: MgO=70.0 to 95.0, $SiO_2$=1.0 to 19.0, and $B_2O_3$=1.0 to 3.0, wherein there is a reactivity of the magnesium oxide of 40 to 400 seconds in the citric acid test and the loss on ignition of component K2 is 0 to 3.0.

19 Claims, No Drawings

COATING SYSTEM BASED ON A COMBINATION OF MONOALUMINUM PHOSPHATE WITH MAGNESIUM OXIDE

CROSS REFERENCE TO RELATED APPLICATIONS

This application is a National Stage of International Application No. PCT/EP2014/053679 filed Feb. 26, 2014, which claims benefit of German Patent Application No. 10 2013 102 301.0 filed Mar. 8, 2013, both of which are herein incorporated by reference in their entirety.

The invention concerns a coating system which includes at least two components K1 and K2 which are to be combined together, wherein the one component contains at least one reactive inorganic phosphate compound and the other component contains at least one reactive metal oxide. In addition the present invention concerns a method of coating a substrate using the coating system according to the invention as well as a coating produced with the coating system according to the invention or using the method according to the invention, and a correspondingly coated object.

For coating various substrates and surfaces there is an ongoing demand for suitable coating agents for imparting the desired surface properties to the treated materials. In that respect particularly desirable coating agents are those with which functional substances of the most widely varying kind, like for example magnetic pigments, anti-corrosion pigments, color pigments, luminophores, pearlescent pigments and metal luster pigments can be applied to the surface of a substrate.

Some inorganic coating systems of the kind set forth in the opening part of this specification are admittedly already described in the state of the art, but very few are also suitable for coating substrates or surfaces with functional substances of the most widely varying kind.

WO 2006/070021 A1 describes a coating system for coating concrete, concrete-like, mineral and/or ceramic substrates, wherein the coating system includes on the one hand a binding agent which substantially comprises an aluminum phosphate, and on the other hand nano-scale metal oxide filler particles. Those nano-scale metal oxide filler particles have to be produced in a relatively complicated and expensive process, which is detrimental in regard to the cost situation of the corresponding coating system.

WO 01/87798 A2 describes a process for the production of a chemically bonded ceramic composite coating, wherein a metal hydroxide is dehydrated and the resulting metal oxide is phosphated with a phosphating agent and then the phosphated metal oxide is calcined at between 200 and 1200° C. The coating obtained in that way acts in its entirety as a ceramic covering for affording protection from wear. It is however not suitable for bonding functional substances like for example titanium oxide, iron oxide or chromium oxide on surfaces without adversely affecting the action thereof. In addition the calcination step in the temperature range of between 200 and 1200° C. requires a high level of energy expenditure, which has effects on the cost factor.

EP 1 624 031 A2 describes a process with which inorganic granular materials can be produced, on the surface of which color pigments are applied with a mixture of water and one or more alkali metal or alkaline earth silicates. It will be noted however that comparatively high firing temperatures in the range of between 200 and 900° C. (preferably >300° C.) are necessary to achieve adequate resistance to water and weather, which greatly limits the choice of possible fixable functional substances and makes the process relatively energy-intensive and costly.

The teaching of DE 10 2010 046 370 A1 provides that, to produce modified surfaces on ceramic, glass and metal, firstly a base coating material is mixed with an additive and, after being applied to the substrate, subjected to a heat treatment, wherein modified silanes are used and the heat treatment is carried out at a temperature in the range of between about 350 and 700° C. This means that this method also requires a relatively high firing temperature, which entails the disadvantages already mentioned above.

All in all there is in this field still a great demand for a coating system with which in particular inorganic substrates and surfaces like for example mineral or vitreous substances and surfaces can be coated with inorganic materials like for example pigments and other functional substances without excessively high temperatures having to be employed in that case. Therefore an object of the present invention is to provide a correspondingly improved coating system with which inorganic substrates can be coated with the most widely varying functional substances, without the high temperatures usually necessary in the state of the art having to be employed.

According to the invention that object is attained by a coating system characterised in that it includes at least one liquid component K1 and at least one solid component K2, wherein the component K1 is an aqueous solution which contains at least the constituents $Al(H_2PO_4)_3$ and
$Al(NaHPO_4)_3$, wherein said constituents of the component K1 are contained on an oxide basis and specified in mass percent with respect to the total mass of the solution with the following proportions in the component K1:

| | |
|---|---|
| $P_2O_5$ | between 25.0 and 37.0 |
| $Al_2O_3$ | between 5.8 and 9.0 |
| $Na_2O$ | between 0.1 and 2.0 |
| $H_2O$ | between 54.0 and 66.0 | and wherein
the component K2 includes at least the constituents
magnesium oxide,
silicate and
borate
which are contained on an oxide basis and specified in mass percent with the following proportions in the component K2:

| | |
|---|---|
| MgO | between 70.0 and 95.0 |
| $SiO_2$ | between 1.0 and 19.0 |
| $B_2O_3$ | between 1.0 and 3.0 | wherein the reactivity of the magnesium oxide determined in accordance with the citric acid test is in the range of between 40 and 400 seconds,
and wherein the ignition loss of the component K2 after tempering for 2 hours at 800° C. is in the range of between 0 and 3.0.

In an embodiment the component K1 in an aqueous solution contains the constituents $Al(H_2PO_4)_3$ (aluminum dihydrogen phosphate or monoaluminum phosphate) and $Al(NaHPO_4)_3$ (aluminum sodium hydrogen phosphate) on an oxide basis and specified in mass percent with respect to the total mass of the solution with the following proportions:

| | |
|---|---|
| $P_2O_5$ | between 30.0 and 35.0 |
| $Al_2O_3$ | between 7.0 and 8.0 |
| $NA_2O$ | between 0.4 and 1.0 |
| $H_2O$ | between 56.0 and 60.0 |

In a further embodiment the component K1 contains the constituents $Al(H_2PO_4)_3$ and $Al(NaHPO_4)_3$ on an oxide basis and specified in mass percent with respect to the total mass of the solution with the following proportions:

| | |
|---|---|
| $P_2O_5$ | between 31.0 and 34.0 |
| $Al_2O_3$ | between 7.5 and 8.0 |
| $NA_2O$ | between 0.5 and 0.8 |
| $H_2O$ | between 57.0 and 59.0 |

In a given embodiment of the present invention the constituents $Al(H_2PO_4)_3$ and $Al(NaHPO_4)_3$ and water are contained in the component K1 with respect to the total mass of the solution of the component K1 and specified in mass percent with the following proportions:
between 40 and 50% of $Al(H_2PO_4)_3$
between 0.5 and 2% of $Al(NaHPO_4)_3$
between 42.5 and 52.5% of $H_2O$ In an embodiment of the present invention the constituents magnesium oxide, silicate and borate are contained in the component K2 on an oxide basis and specified in mass percent with respect to the total mass of the component K2 with the following proportions:

| | |
|---|---|
| MgO | between 80.0 and 95.0 |
| $SiO_2$ | between 1.0 and 12.0 |
| $B_2O_3$ | between 1.0 and 2.0 |

In a further embodiment of the present invention the constituents magnesium oxide, silicate and borate are contained in the component K2 on an oxide basis and specified in mass percent with respect to the total mass of the component K2 with the following proportions:

| | |
|---|---|
| MgO | between 72.0 and 78.0 |
| $SiO_2$ | between 9.0 and 12.0 |
| $B_2O_3$ | between 1.2 and 1.8 |

An embodiment of the present invention is characterised in that the component K2 with respect to the total mass of the component K2 and specified in mass percent includes at least the following constituents:
between 60 and 80% of magnesium oxide
between 10 and 20% of silicate
between 2 and 20% of borate The silicates contained in the component K2 are preferably in mineral or vitreous form, that is to say as silicate minerals or glass frits. The term silicate minerals is used here to denote both naturally occurring and also technically produced silicate minerals, wherein those silicate minerals are preferably selected from talcum, mica, kaolin, metakaolin, bentonite, wollastonite, silicate glass and combinations thereof. The term glass frits is used to denote technically produced silicate-based glasses.

According to the present invention a magnesium oxide is used whose reactivity determined in accordance with the citric acid test, is in a range of between 40 and 400 seconds. In a preferred embodiment of the invention the reactivity of the magnesium oxide, determined in accordance with the citric acid test, is in the range of between 40 and 250 seconds.

The citric acid test for determining the reactivity of the magnesium oxide used according to the invention is performed for the purposes of the present invention in accordance with the following specification:

To determine the citric acid number with which the reactivity of magnesium oxide is expressed, the time is measured, in which a predetermined amount of citric acid is neutralized by a predetermined amount of magnesium oxide. For that purpose 2.6 g of citric acid is dissolved in 100 ml of water. The citric acid solution produced in that way is added together with 0.01 g of phenolphthalein to a dispersion of 1.7 g of magnesium oxide in 100 ml of water, wherein the temperature of the water should be 22° C. As from the moment of adding the citric acid solution to the magnesium oxide dispersion, the time is measured which elapses until the color change of the phenolphthalein takes place from colorless to pink. The shorter the time elapsing until the color change occurs, the correspondingly easier are the basic groups of the magnesium oxide available for the neutralization of acids. Accordingly the citric acid test is a measurement in respect of the reactivity of the magnesium oxide, determined on the basis of the availability of basic groups on the surface of the magnesium oxide, that can be wetted by water.

According to the invention, when determined in accordance with that test method, magnesium oxide qualities with a citric acid number in the range of between 40 and 400 seconds are required as magnesium oxide qualities with a citric acid number of <40 seconds are too reactive, which would have the result that the primary reaction for the secondary components which are important for the later resistance of the coating takes place too quickly so that a sufficiently vitreous network is not formed.

On the other hand magnesium oxide qualities with a citric acid number of >400 seconds are not reactive enough so that the primary reaction takes place too slowly and accordingly energy is liberated too slowly. To achieve a sufficiently vitreous network therefore with such slightly reactive magnesium oxide qualities, it is necessary to supply additional energy from the exterior, that is to say the lower level of reactivity has to be compensated by higher firing temperatures.

According to the invention the ignition loss of the component K2 after tempering for 2 hours at 800° C. is in the range of between 0 and 3.0. If the ignition loss of the component K2 after tempering for 2 hours at 800° C. is above 3.0 then that has a detrimental effect on the reactivity of the magnesium oxide contained in the component K2 as then too much water is contained in the component K2.

In addition the particle size of the solid component K2 also has an influence on reactivity. Thus it is possible to operate with smaller grain sizes in the case of more reactive magnesium oxide qualities while preferably larger grain sizes are adopted when using less reactive magnesium oxide qualities. Preferably the magnesium oxide in the component K2 has a maximum particle size of 100 μm.

According to the invention the reactivity of K1 and K2 is so matched that, when coating a substrate with the coating system according to the invention, relatively stable bonding to the respective substrate is already achieved after a few minutes due to the reactions of K1 with K2, which already take place at ambient temperature. In a subsequent tempering process the coating matrix is homogeneously polymerized out, solidifies and forms a permanent bond to the substrate.

The temperatures necessary in the tempering operation for complete bonding, polymerization and solidification of the system are between 140 and 200° C. depending on substrate, proportion and nature of the functional substance and well as the process times. The substance combination according to the invention with the claimed proportion ratios therefore already permits hardening of the coating composition applied to a substrate at temperatures of less than 200° C. Preferably a hardening temperature in the range of between 140 and 200° C. is selected. The temperature range of between 140 and 195° C. is particularly preferred, still more preferably the range of between 180 and 195° C.

During the coating process the liquid component K1 polymerizes due to the reaction with the solid component K2, forming a vitreous, non-crystalline coating. Only a few incompletely reacted crystalline proportions of the component K2 remain in the coating depending on the respective reaction procedure. The coatings obtained with the coating system according to the invention are therefore characterised in that they are not crystalline but are vitreous. Functional substances can be particularly well received into that vitreous system on the substrate or the surface to be coated. In that way the particles of the functional substances can be particularly well bonded to the surface of the substrate.

In connection with the present invention a material is to be referred to as "vitreous" or "glass" when the material in the solid state has a network structure with a near order but not a crystalline grating with a crystalline far order. Whether a glass is involved in accordance with the present invention is something that the man skilled in the art can easily ascertain by X-ray diffraction analysis.

The polymerized coating agent is water- and weather-resistant and can be used in various ways both internally and externally. Thus widely varying decorative color pigments can be applied to mineral carrier materials like for example sands or chippings which are then used in wall and roof coatings as a decorative and protective element. Rust-inhibiting pigments can be bonded to metal surfaces and are stable up to comparatively high temperatures of use. Depending on the respective task to be performed internally or externally infrared-absorbent or also reflecting pigments can be applied to the most widely varying mineral building materials (like for example: roof tiles, glass, façade panels) in order to be able to influence and control temperature management in and on buildings. Pigments with an antimicrobial action can be applied to building materials. Likewise luminophores, that is to say substances which luminesce in the dark, for example in the form of glass particles doped with luminescent ions, can be applied to various materials in order for example to identify emergency escape routes in the event of a sudden lighting failure.

The phosphate compounds contained in the liquid component K1 of the coating system according to the invention have slightly acid properties and should therefore be completely reacted out if for example good weather resistance of the coating to be produced is to be guaranteed. For that reason it is therefore also essential for the phosphate compounds contained in the component K1 to be used in the ranges claimed for the present invention.

In a preferred embodiment of the present invention the component K1 additionally contains dissolved borates which are contained on an oxide basis with respect to the total mass of the solution with up to 1.5 mass percent of $B_2O_3$ in the component K1. Examples of borates which can be used in this context without limitation thereto are boric acid, sodium borate, calcium borate, aluminum borate and zinc borate. The function of the borates in the coating system according to the invention is to promote glass formation and overall to increase the vitreous proportion of the coating.

An embodiment of the coating system according to the invention is characterised in that the component K1 additionally contains dissolved silicates which are contained on an oxide basis with respect to the total mass of the solution with up to 1.0 mass percent of $SiO_2$ in the component K1. The component K1 can in many cases better engage the substrate due to the addition of silicates to the component K1. Preferably the silicates which are to be optionally added to the component K1 are selected from readily soluble alkali metal silicates like for example sodium metal silicates, sodium disilicate or potassium silicate.

In still a further embodiment of the present invention soluble fluorides are additionally added to the component K1, which are contained on an oxide basis with respect to the total mass of the solution with up to 1.0 mass percent of $F^-$ in the component K1. The reactivity of the component K1 in relation to various substrates is improved by the addition of fluorides to the component K1.

In a given embodiment of the present invention the component K1 as an additional constituent includes a proportion of $Mg(H_2PO_4)_2$ (=magnesium dihydrogen phosphate or monomagnesium phosphate). Preferably the proportion of magnesium oxide dihydrogen phosphate with respect to the total mass of the solution of the component K1 is up to 7 mass percent. In a particularly preferred embodiment of the present invention with magnesium dihydrogen phosphate in the component K1 the component K1 specified in mass percent with respect to the total mass of the component K1 includes at least the following constituents:

between 40 and 50% of $Al(H_2PO_4)_3$
up to 7% of $Mg(H_2PO_4)_2$
between 0.5 and 2% of $Al(NaHPO_4)_3$
between 42.5 and 52.5% of $H_2O$.

Further substances can also be added to the component K2 of the coating system according to the invention in order to further improve the coating properties of the coating system. For example in certain embodiments of the invention borates of calcium, aluminum and/or zinc or mixtures thereof are added to the component K2.

The borates added to the component K2 also lead to an improvement in glass formation in the coating process. Preferably borates of calcium are contained in the component K2 on an oxide basis and specified in mass percent with respect to the total mass of the component K2, with a proportion of up to 5.0 mass percent of CaO. The proportion of aluminum borates on an oxide basis and specified in mass percent with respect to the total mass of the component K2 is preferably between 7.5 and 15.0 mass percent of $Al_2O_3$, preferably between 7.5 and 10.0 mass percent of $Al_2O_3$, still more preferably between 7.5 and 9.0 mass percent of $Al_2O_3$. Borates of zinc are preferably contained in the component K2 with up to 4.5 mass percent of ZnO. Zinc borates are particularly preferred as they can already markedly enhance the weather resistance of the coating at comparatively low firing temperatures, in so far as they promote linking of the individual components and constituents of the coating.

In a given embodiment of the coating system according to the invention the component K2 additionally contains titanium oxide and/or zinc oxide as further constituents. Preferably those constituents are contained on an oxide basis and specified in mass percent with respect to the total mass of the component K2 with the following proportions in the component K2:

up to 1.0 mass percent of $TiO_2$ and/or
up to 4.5 mass percent of ZnO.

The mixture ratio of component K1 to component K2 is to be adjusted according to which respective substrate is to be coated, what functional substance is to be applied with the coating system according to the invention and what specific properties the coating produced with the coating system according to the invention is to have. Preferably the mixture ratio of K1 to K2 is in the range of between 5:1 and 10:1.

As already mentioned in the opening part of this specification the coating system according to the invention has in particular the advantage that the most widely varying functional substances can be applied therewith to a substrate. Those functional substances can be for example color pigments (like chrome oxide green, iron oxide red or black), catalytically active pigments (like titanium dioxide in the rutile modification), biocidal or fungicidal substances (like silver or silver compounds) or fluorescent substances (like fluorescence glass). The functional substances however can also be those substances which alter the surface structure (like fine sand), the electrical resistance (like graphite), the thermal resistance (like polystyrene) or the reflection proportions (like metal effect particles). Preferably the functional substances are inorganic functional substances.

In an embodiment of the invention the above-mentioned functional substances are prepared as a constituent of the component K1. In an alternative embodiment the functional substances are prepared as a constituent of the component K2. In still a further embodiment the functional substances are prepared as a constituent of an additional component K3, wherein that additional component K3 can be prepared as a solid, liquid, solution or suspension.

The coating system according to the invention has the advantage that very good wetting of the substrate to be coated and a high level of adhesion of the coating to the substrate are achieved. In addition a coating with a very thin layer thickness can also be produced with the coating system according to the invention. That has the advantage that, in situations where an optically active functional substance is incorporated into the coating, the coating, even after binding, is sufficiently transparent in the respectively relevant spectral range to influence the properties of the functional substance as little as possible.

In order to produce a desired coating on a substrate with the coating system according to the invention it is possible to use various methods. What is common to all methods is only the fact that the liquid component K1 of the coating system according to the invention is brought into contact with the solid component K2 of the coating system according to the invention at a given moment in time in the method.

If the substrate and the functional substance to be applied to the substrate is present in powder or granular form then preferably firstly the component K2 according to the invention is distributed in powder form finely on the surface of the substrate to be coated. For that purpose the component K2 can for example be intensively mixed with the substrate in powder or granular form. If a functional substance is to be applied to the surface of the substrate that can either be applied simultaneously with the component K2 or the functional substance can be added to the liquid component K1 and dispersed therein. Which variant in that respect is adopted is dependent inter alia on the form in which the functional substance to be applied is present, what particle size and particle size distribution is involved and whether the functional substance to be applied is stable in the slightly acid component K1.

If however the substrate is not in a miscible form the component K2 can also be applied with other methods which are suitable for applying power to surfaces. For example it is also possible for the component K2 to be dispersed in powder form in a liquid like for example water and applied as a dispersion to the substrate. It will be noted that the liquid then has to be removed again prior to further processing.

In this case the functional substance to be applied to the surface can also be applied either at the same time as the component K2. Alternatively the functional substance can be added to the liquid component K1 and dispersed therein. Here too the choice of the respective method depends on the form in which the functional substance to be applied is present, what particle size and particle size distribution is involved and whether the functional substance to be applied is stable in the slightly acid component K1.

The component K1 is then applied to the substrate coated with the component K2 (and possibly with the functional substance to be applied), which can be effected for example by mixing it in, when the substrate is in the form of a miscible shaped body. Alternatively the component K1 can also be applied by spraying, dipping, rolling or painting on.

A further possible form of use of the coating system according to the invention is direct application of a mixture of the components K1 and K2, possibly in combination with a functional substance. That application technology is advantageous when the layer thickness of the resulting coating is to be comparatively great, when the functional substance is difficult to wet and/or apply, and when the coating reaction is to take place very quickly. In that case it may be advantageous for the liquid component K1 to be cooled prior to the mixing operation and/or for the solid component K2 to be coated with suitable materials to reduce reactivity and achieve a longer processing time.

By the liquid component K1 of the coating system according to the invention being brought into contact with the solid component K2 of the coating system according to the invention in the coating operation, the result obtained is a coating which substantially comprises a combination of the liquid component K1 and the solid component K2, possibly combined with a functional substance. A coating obtained in that way is embraced by the present invention, and likewise an object whose surface is coated with the coating system according to the invention, in accordance with the method according to the invention or with the coating according to the invention.

Preferably the substrate or object which is coated or is to be coated is a substrate or an object of an inorganic material, that inorganic material preferably being selected from quartz sand, argillaceous shale, clay tiles and bricks, mudstone, bricks and clinker and silicate glass.

A coating produced with the coating system according to the invention is composed of the constituents contained in the components K1 and K2 and possibly one or more functional substance to be applied with the coating to the surface of a substrate. With a mixing ratio of 7 parts of K1 to 1 part of K2 that affords on an oxide basis for example the following coating composition:

| Constituent | Mass % |
|---|---|
| $P_2O_5$ | 21.9-32.4 |
| $B_2O_3$ | 0.2-1.7 |

-continued

| Constituent | Mass % |
| --- | --- |
| $SiO_2$ | 1.0-3.3 |
| $Al_2O_3$ | 6.0-9.8 |
| $Na_2O$ | 0.2 to 2.1 |
| MgO | 8.1-11.1 |

In addition the above-specified coating composition can also have the following proportions of calcium oxide (for example impurities from silicate minerals), zinc oxide and titanium oxide:

| Constituent | Mass % |
| --- | --- |
| CaO | 0-0.6 |
| ZnO | 0-0.6 |
| $TiO_2$ | 0.0-0.1 |

For the purposes of the original disclosure it is pointed out that all features as can be seen by a man skilled in the art from the present description and the accompanying claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

It is further pointed out that it is self-evident to the man skilled in the art that the embodiments by way of example hereinafter only serve to set forth by way of example the possible configurations of the present invention, which are reproduced as embodiments by way of example. The man skilled in the art will therefore readily appreciate that in addition other embodiments having the features or combinations of features according to the invention as set forth in the claims lie within the scope of protection of the invention. A comprehensive explicit representation of all conceivable embodiments is also dispensed with here only for the sake of brevity and readability of the description.

EMBODIMENTS BY WAY OF EXAMPLE

Example 1

Bonding of black pigment (iron oxide black, Pigment Black 11 from Heucodur) on a quartz sand substrate particle size: 0.3-0.8 mm and with an $SiO_2$ proportion >98%:
K1: Solution

| Raw material | Mass % |
| --- | --- |
| Water | 48.5 |
| Monoaluminum phosphate | 43.0 |
| Monomagnesium phosphate | 7.0 |
| Sodium tetraborate | 1.5 |

K2: Powder Mixture

| Raw material | Mass % |
| --- | --- |
| Magnesium oxide | 70 |
| Metakaolin | 20 |
| Calcium metaborate | 10 |

Example 2

Bonding of red pigment (iron oxide red, Pigment Red 101) on slate flakes (1.0-3.0 mm).
K1: Solution

| Raw material | Mass % |
| --- | --- |
| Water | 49.0 |
| Monoaluminum phosphate | 49.0 |
| Sodium hydroxide | 2.0 |

K2: Powder Mixture

| Raw material | Mass % |
| --- | --- |
| Magnesium oxide | 70.6 |
| Kaolin | 13.4 |
| Mica | 5.0 |
| Aluminum borate | 11.0 |

Example 3

Bonding of fluorescent glass beads (Ø<100 µm) on silicate glass.
K1: Solution

| Raw material | Mass % |
| --- | --- |
| Water | 49.0 |
| Monoaluminum phosphate | 49.0 |
| Sodium hydroxide | 1.0 |
| Sodium tetraborate | 1.0 |

K2: Powder Mixture

| Raw material | Mass % |
| --- | --- |
| Magnesium oxide | 94.0 |
| Metakaolin | 1.0 |
| Bentonite | 1.0 |
| Zinc borate | 2.0 |
| ZnO | 2.0 |

Example 4

Bonding of polystyrene balls (Ø0.5-1.5 mm) on ceramic substrate.
K1: Solution

| Raw material | Mass % |
| --- | --- |
| Water | 49.0 |
| Monoaluminum phosphate | 49.0 |

-continued

| Raw material | Mass % |
| --- | --- |
| Sodium hydroxide | 1.0 |
| Sodium tetraborate | 1.0 |

K2: Powder Mixture

| Raw material | Mass % |
| --- | --- |
| Magnesium oxide | 76.0 |
| Metakaolin | 15.0 |
| Talcum | 5.0 |
| Zinc borate | 2.0 |
| ZnO | 2.0 |

Results
Assessment of the Bonding Force and the Water Resistance of the Bond (Boiling Test)

For determining the bonding force and the bonding strength of a coating produced with the coating system according to the invention a method is used, which is referred to hereinafter as the boiling test.

A substrate coated with the coating system according to the invention is used for the boiling test, the coating produced in that way containing a pigment. After complete hardening of the coating the coated substrate is boiled in water for 30 minutes without further agitation at 100° C. Pigment which is released in that situation leads to clouding of the boiling water. That clouding is now measured. The lower the clouding value, the correspondingly better are the strength and water resistance of the coating bond.

The determining procedure is not an absolute method but a relative method, that is to say it is not possible with that method to compare different coating agents in different substrate/pigment combinations with each other. It is only possible to compare together different coating agents within one substrate/pigment combination.

For the standard test, the black pigment (Pigment Black 11 from Heucodur) in combination with a quartz sand, a slate flake or a silicate glass powder is used. The amount of pigment and the amount of coating agent depend on the substrate to be tested.

The invention claimed is:

1. A coating system comprising:
   at least one liquid component K1 and at least one solid component K2,
   wherein the component K1 is an aqueous solution which contains at least the constituents:
   $Al(H_2PO_4)_3$ and
   $Al(NaHPO_4)_3$,
   wherein said constituents of the component K1 are contained on an oxide basis and specified in mass percent with respect to the total mass of the solution with the following proportions in the component K1:
   $P_2O_5$ between 25.0 and 37.0
   $Al_2O_3$ between 5.8 and 9.0
   $Na_2O$ between 0.1 and 2.0
   $H_2O$ between 54.0 and 66.0,
   wherein the component K2 includes at least the constituents:
   magnesium oxide,
   silicate and
   borate,
   wherein said constituents of the component K2 are contained on an oxide basis and specified in mass percent with respect to the total mass of the component K2 with the following proportions in the component K2:

| MgO | between 70.0 and 95.0 |
| --- | --- |
| $SiO_2$ | between 1.0 and 19.0 |
| $B_2O_3$ | between 1.0 and 3.0, | wherein the reactivity of the magnesium oxide determined in accordance with the citric acid test is in the range of between 40 and 400 seconds, the citric acid test corresponding to a time to neutralize a predetermined amount of citric acid by a predetermined amount of magnesium oxide, and
wherein the ignition loss of the component K2 after tempering for 2 hours at 800° C. is in the range of between 0 wt. % and 3.0 wt. %.

2. The coating system as set forth in claim 1, wherein the component K1 additionally contains dissolved borates which are contained on an oxide basis and specified in mass percent with respect to the total mass of the solution with up to 1.5 mass percent of $B_2O_3$ in the component K1.

3. The coating system as set forth in claim 1, wherein the component K1 additionally contains dissolved silicates which are contained on an oxide basis and specified in mass percent with respect to the total mass of the solution with up to 1.0 mass percent of $SiO_2$ in the component K1.

4. The coating system as set forth in claim 1, wherein the component K1 additionally contains dissolved fluorides which are contained on an oxide basis and specified in mass percent with respect to the total mass of the solution with up to 1.0 mass percent of $F^-$ in the component K1.

5. The coating system as set forth in claim 1, wherein the component K2 contains borates of calcium, aluminum and/or zinc or mixtures thereof which are contained on an oxide basis and specified in mass percent with respect to the total mass of the component K2 with the following proportions in the component K2:
   up to 5.0 mass percent of CaO,
   between 7.5 and 15.0 mass percent of $Al_2O_3$, and
   up to 4.5 mass percent of ZnO.

6. The coating system as set forth in claim 1, wherein the silicate is present in the component K2 in mineral form, selected from talcum, mica, kaolin, metakaolin, bentonite, wollastonite, silicate glass and combinations thereof.

7. The coating system as set forth in claim 1, wherein the mixture ratio of component K1 to component K2 is in the range of between 5:1 and 10:1.

8. The coating system as set forth in claim 1, wherein as a constituent of component K1, as a constituent of component K2 and/or as a constituent of an additional component K3, the coating system includes a substance selected from the group consisting of functional pigments, catalytically active pigments, bio- or fungicidal substances, and fluorescent substances or substances which alter the surface structure, the electrical resistance, the thermal resistance or the reflection properties of a surface.

9. The coating system as set forth in claim 1, wherein the component K1 specified in mass percent with respect to the total mass of the component K1 includes at least the following constituents:
   between 40 and 50% of $Al(H_2PO_4)_3$
   up to 7% of $Mg(H_2PO_4)_2$
   between 0.5 and 2% of $Al(NaHPO_4)_3$
   between 42.5 and 52.5% of $H_2O$.

10. A coating method using the coating system of claim 1, comprising bringing the liquid component K1 in into contact with the solid component K2 to form a coating.

11. A coating formed from the coating system of claim 1, comprising a combination of the liquid component K1 with the solid component K2.

12. An object comprising the coating of claim 11.

13. The method as set forth in claim 10, wherein the coating is effected on an inorganic material.

14. The method as set forth in claim 10, wherein the coating is a vitreous coating.

15. The method as set forth in claim 10, wherein the coating on an oxide basis and specified in mass percent of dry substance includes the specified constituents with the following proportions:

| | |
|---|---|
| $P_2O_5$ | between 21.9 and 32.4 |
| $Al_2O_3$ | between 6.0 and 9.8 |
| $Na_2O$ | between 0.2 and 2.1 |
| MgO | between 8.1 and 11.1 |
| $SiO_2$ | between 1.0 and 3.3 |
| $B_2O_3$ | between 0.2 and 1.7. |

16. An object comprising a coating, wherein the coating is applied by the coating method of claim 10.

17. The coating as set forth in claim 11, wherein the coating is on an inorganic material.

18. The coating as set forth in claim 11, wherein the coating is a vitreous coating.

19. The coating as set forth in claim 11, wherein the coating on an oxide basis and specified in mass percent of dry substance includes the specified constituents with the following proportions:

| | |
|---|---|
| $P_2O_5$ | between 21.9 and 32.4 |
| $Al_2O_3$ | between 6.0 and 9.8 |
| $Na_2O$ | between 0.2 and 2.1 |
| MgO | between 8.1 and 11.1 |
| $SiO_2$ | between 1.0 and 3.3 |
| $B_2O_3$ | between 0.2 and 1.7. |

\* \* \* \* \*